United States Patent
Dayak et al.

(10) Patent No.: US 11,685,670 B2
(45) Date of Patent: Jun. 27, 2023

(54) APPARATUS AND METHOD FOR OPTIMIZING HYDRO-CYCLONE SEPARATION IN A FILTERING SYSTEM

(71) Applicant: Velocity Water Works LLC, Kaukauna, WI (US)

(72) Inventors: Jay Scott Dayak, Davenport, FL (US); Theodore Paul LaVigne, Everett, WA (US)

(73) Assignee: Velocity Water Works LLC, Kaukauna, WI (US)

( * ) Notice: Subject to any disclaimer, the term of this patent is extended or adjusted under 35 U.S.C. 154(b) by 479 days.

(21) Appl. No.: 17/013,950

(22) Filed: Sep. 8, 2020

(65) Prior Publication Data

US 2022/0073370 A1    Mar. 10, 2022

(51) Int. Cl.
| | |
|---|---|
| *C02F 1/00* | (2023.01) |
| *C02F 1/38* | (2023.01) |
| *B01D 21/26* | (2006.01) |
| *B01D 21/30* | (2006.01) |
| *C02F 103/44* | (2006.01) |

(52) U.S. Cl.
CPC ............ *C02F 1/008* (2013.01); *B01D 21/267* (2013.01); *B01D 21/302* (2013.01); *C02F 1/38* (2013.01); *C02F 2103/44* (2013.01); *C02F 2209/03* (2013.01); *C02F 2209/40* (2013.01); *C02F 2301/046* (2013.01)

(58) Field of Classification Search
None
See application file for complete search history.

(56) References Cited

U.S. PATENT DOCUMENTS

| | | | |
|---|---|---|---|
| 3,208,201 A * | 9/1965 | Oliver, III | C10G 33/06 494/32 |
| 3,774,625 A | 11/1973 | Wiltrout | |
| 4,168,231 A | 9/1979 | Allen et al. | |
| 4,168,232 A | 9/1979 | Allen et al. | |
| 6,132,630 A * | 10/2000 | Briant | B01D 17/047 210/806 |
| 9,422,181 B1 | 8/2016 | Borchard et al. | |
| 2005/0184011 A1 | 8/2005 | Fields | |

FOREIGN PATENT DOCUMENTS

GB    1407894    10/1975

* cited by examiner

*Primary Examiner* — Richard C Gurtowski
(74) *Attorney, Agent, or Firm* — Laurence A. Greenberg; Werner H. Stemer; Ralph E. Locher

(57) ABSTRACT

An apparatus and method for optimizing hydro-cyclone separation in a filtering system is disclosed. The apparatus includes a first, second and third storage tanks, a pump, a motor, a variable speed drive, and a hydro-cyclone. The pump pulls fluid from the third storage tank and routes it to the hydro-cyclone where particles are separated out. The filtered fluid is then routed onto a mechanism, such as a car wash, where the clean fluid is utilized. Since the car wash cannot always use all of the filtered fluid, a controller monitor flow rate and fluid pressure, and operates a proportional fluid control valve to bypass some or all of the fluid routed to the car wash and redirect it back to the second storage tank. This process allows the hydro-cyclone to operate at maximum efficiency while flow to the carwash may vary. The dirty particles separated out by the hydro-cyclone are routed to the first storage tank.

20 Claims, 2 Drawing Sheets

APPARATUS AND METHOD FOR OPTIMIZING HYDRO-CYCLONE SEPARATION IN A FILTERING SYSTEM

FIELD OF THE INVENTION

This invention relates to an apparatus and method for optimizing hydro-cyclone separation in a filtering system.

BACKGROUND OF THE INVENTION

Today, it is common practice to use hydro-cyclone technology to sort, qualify and/or separate solid particles from a fluid, primarily water, that is being recycled for use in a commercial carwash facility. The principles involve employing one or more hydro-cyclones, utilizing a pump which is capable of creating a predetermined of flow and pressure, and establishing a flow path which is suitable for delivery of incoming fluid to the hydro-cyclone(s). A hydro-cyclone is designed to separate out and remove heavier and/or larger size solid particles from the incoming fluid. The hydro-cyclone has a cone shaped inner surface which narrows towards its bottom. The incoming fluid is forced out against the inner surface of the hydro-cyclone and the speed of the fluid increases as it enters the lower portion of the cone shape. A vortex is formed when the revolving fluid reaches an optimal speed for the centrifugal forces to be the same as the specific weight of water. The fluid velocity is greatest next to the vortex. This forces the heavier and/or larger size solid particles, those particles having a specific weight greater than that of water, to the outer surface of the lower portion of the hydro-cyclone. The cleaner fluid is forced up and out through the top of the hydro-cyclone and is then routed to the carwash mechanism. The heavier and/or larger size solid particles collect against the inner wall of the lower portion of the hydro-cyclone and are discharged through a bottom opening as filtered substance. The filtered substance is later discarded, such as by transporting it to a landfill.

Most current carwash filtering systems operate with a variable fluid flow. However, a hydro-cyclone is most effective when a continuous, steady fluid flow is present and the fluid is at a predetermined speed. A reduced fluid flow and/or a reduced velocity of the fluid to the hydro-cyclone lowers the centrifugal forces within the hydro-cyclone and decreases its ability to separate out the heavier and/or larger size solid particles. The resultant effect is that the heavier and/or larger size solid particles will be allowed to pass unfiltered through the hydro-cyclone. Should the speed of the fluid continue to decrease to a point where a vortex can no longer be developed within in the hydro-cyclone, the fluid will essentially flow through the hydro-cyclone unfiltered.

Now, an apparatus and method for optimizing hydro-cyclone separation has been invented.

SUMMARY OF THE INVENTION

Briefly, this invention relates to apparatus and method for optimizing hydro-cyclone separation in a filtering system. The apparatus includes a series of storage tanks sized in accordance with the total flow through them. All the tanks are sequentially fluidly connected. A pump driven by a motor having a variable speed drive, and having an inlet and an outlet, is connected to the third storage tank by a first fluid line. A hydro-cyclone having an inlet port, a first outlet port and a second outlet port, is positioned downstream of the pump. A second fluid line connects the outlet of the pump to the inlet port of the hydro-cyclone. A first pressure transducer is positioned across the second fluid line for the purpose of measuring pump pressure. A third fluid line connects the first outlet port of the hydro-cyclone to a mechanism dispensing filtered fluid, such as a carwash. A flow transducer is positioned across the third fluid line for measuring fluid flow. A second pressure transducer is positioned across the third fluid line downstream of the flow transducer for measuring output pressure. A fourth fluid line fluidly intersects the third fluid line, between the flow transducer and the second pressure transducer. The fourth fluid line communicates with the second storage tank. A proportional flow control valve is positioned across the fourth fluid line. A fifth fluid line connects the second outlet port of the hydro-cyclone to the first storage tank for removing solid particles from the hydro-cyclone. Lastly, a controller is electrically connected to the variable speed drive, the first pressure transducer, the flow transducer, the second pressure transducer, and to the proportional flow control valve. The controller continuously monitors the fluid pressure and the fluid flow, and generates a signal to operate the proportional flow control valve whereby excess fluid can be routed to the second storage tank.

Another apparatus includes a first storage tank, a second storage tank, a third storage tank and a fourth storage tank, all sequentially fluidly connected. A pump driven by a motor having a variable speed drive, and having an inlet and an outlet, is connected to the fourth storage tank by a first fluid line. A hydro-cyclone having an inlet port, a first outlet port and a second outlet port, is positioned downstream of the pump. A second fluid line connects the outlet of the pump to the inlet port of the hydro-cyclone. A first pressure transducer is positioned across the second fluid line for measuring pump pressure. A third fluid line connects the first outlet port of the hydro-cyclone to a mechanism dispensing filtered fluid, such as a carwash. A flow transducer is positioned across the third fluid line for measuring fluid flow. A second pressure transducer is positioned across the third fluid line downstream of the flow transducer for measuring output pressure. A fourth fluid line fluidly intersects the third fluid line, between the flow transducer and the second pressure transducer. The fourth fluid line communicates with the second storage tank. A proportional flow control valve is positioned across the fourth fluid line. A fifth fluid line connects the second outlet port of the hydro-cyclone to the first storage tank for removing solid particles from the hydro-cyclone. Lastly, a controller is electrically connected to the variable speed drive, the first pressure transducer, the flow transducer, the second pressure transducer, and to the proportional flow control valve. The controller continuously monitors the fluid pressure and the fluid flow, and generates a signal to open and close the proportional flow control valve whereby excess fluid can be routed to the second storage tank.

The method for optimizing hydro-cyclone separation in a filtering system includes a filtering system having a first storage tank, a second storage tank, and a third storage tank, all sequentially fluidly connected. A pump driven by a motor having a variable speed drive, and having an inlet and an outlet, is connected to the third storage tank by a first fluid line. A hydro-cyclone having an inlet port, a first outlet port and a second outlet port is positioned downstream of the pump. A second fluid line connects the outlet of the pump to the inlet port of the hydro-cyclone. A first pressure transducer is positioned across the second fluid line for measuring pump pressure. A third fluid line connects the first outlet port of the hydro-cyclone to a mechanism dispensing filtered fluid, such as a carwash. A flow transducer is positioned across the third fluid line for measuring fluid flow. A second pressure transducer is positioned across the third fluid line downstream of the flow transducer for measuring output pressure. A fourth fluid line intersects the third fluid line between the flow transducer and the second pressure transducer. The fourth fluid line communicates with the second storage tank. A proportional flow control valve is positioned across the fourth fluid line. A fifth fluid line connects the second outlet port of the hydro-cyclone to the first storage tank for removing solid particles from the hydro-cyclone. Lastly, a controller is electrically connected to the variable speed drive, the first pressure transducer, the flow transducer, the second pressure transducer, and to the proportional flow control valve.

The method includes the steps of routing outside fluid into the second storage tank. Activating the variable speed drive to control the motor and operate the pump to route fluid from the third storage tank to the hydro-cyclone and past the first pressure transducer. The method also includes using the hydro-cyclone to separate out the heavier and/or larger size solid particles from the fluid. The filtered fluid is routed through the third fluid line and past the flow transducer and the second pressure transducer to the mechanism dispensing the filtered fluid, such as a carwash. Lastly, the method includes using the controller to constantly monitor the variable speed drive, the first pressure transducer, the flow transducer, and the second pressure transducer, and to generate a signal to open and close the proportional flow control valve whereby excess fluid can be routed to the second storage tank.

The general object of this invention is to provide an apparatus and method for optimizing hydro-cyclone separation in a filtering system. A more specific object of this invention is to provide an apparatus and method for optimizing hydro-cyclone separation in a filtering system which is economical to operate.

Another object of this invention is to provide an apparatus for optimizing hydro-cyclone separation in a filtering system which is simple to install.

A further object of this invention is to provide an apparatus for optimizing hydro-cyclone separation in a filtering system which uses two or more hydro-cyclones arranged in parallel.

Still another object of this invention is to provide an apparatus for optimizing hydro-cyclone separation in a filtering system which adds a secondary flow path for the fluid to return to a storage tank when the system does not require full capacity of the filtered fluid.

Still further, an object of this invention is to provide a method for optimizing hydro-cyclone separation in a filtering system which is easy to utilize.

Other objects and advantages of the present invention will become more apparent to those skilled in the art in view of the following description and the accompanying drawings.

DETAILED DESCRIPTION OF THE INVENTION

Figure 1:
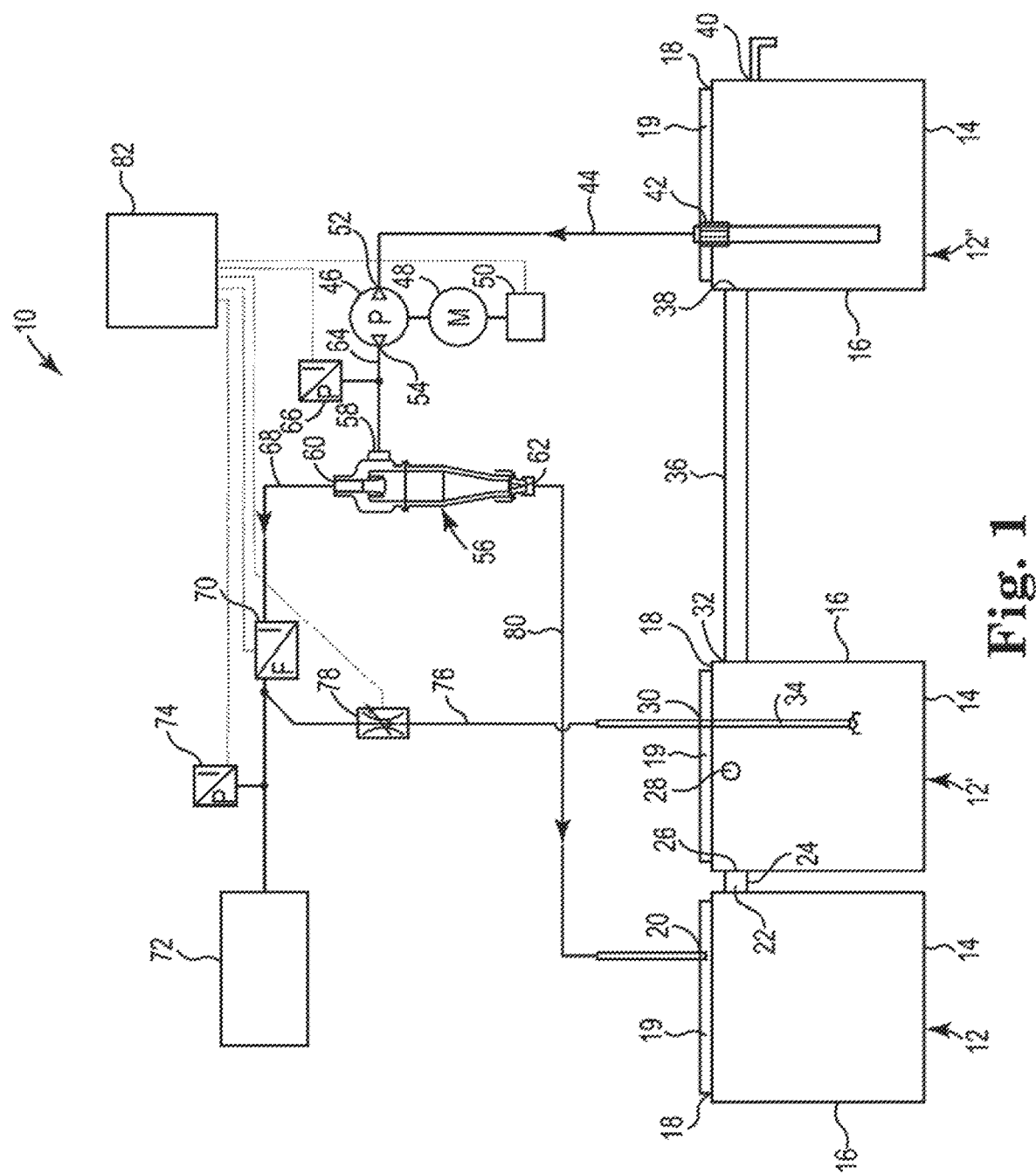
FIG. 1 is a schematic for optimizing hydro-cyclone separation in a filtering system.
Figure 2:
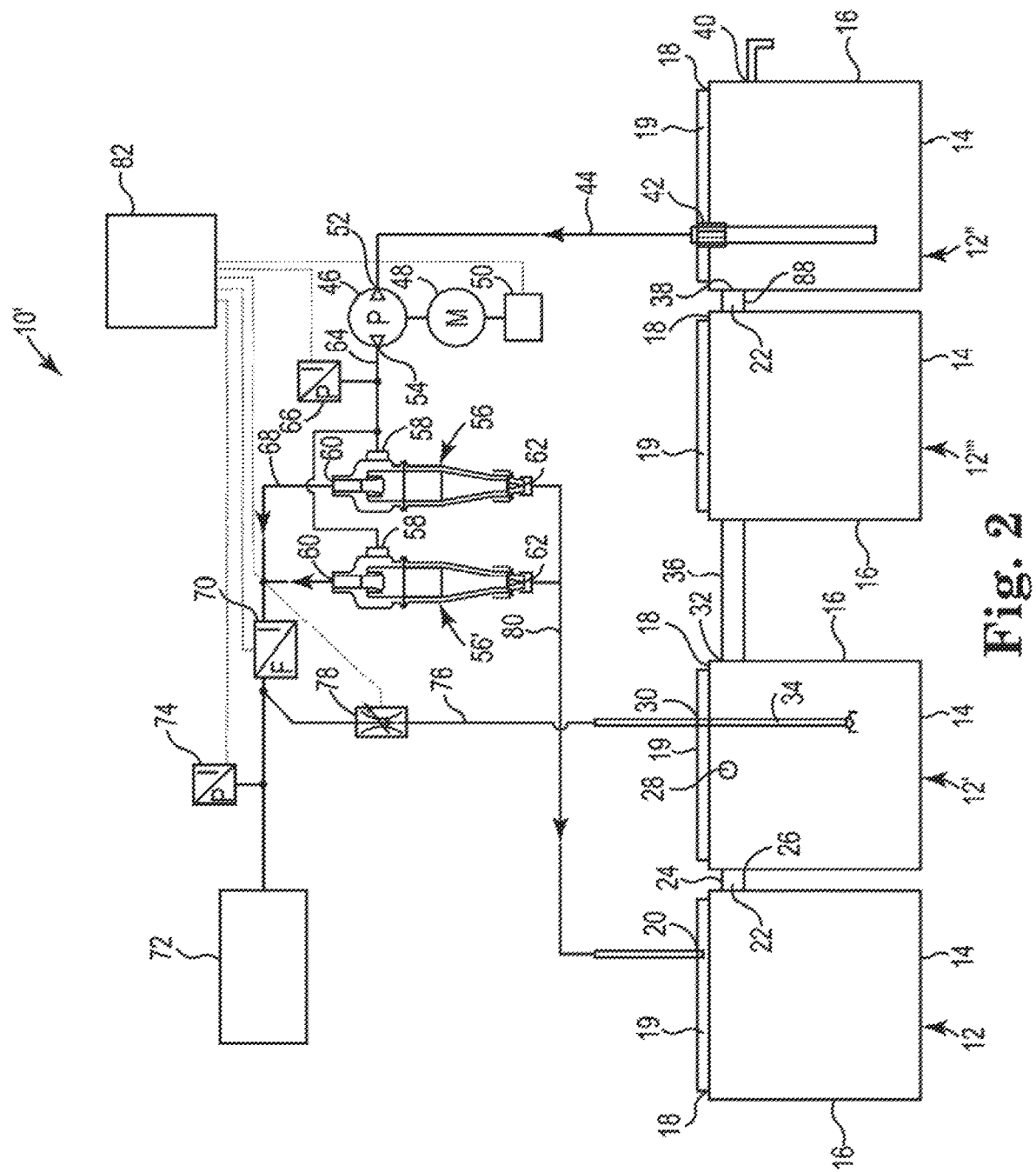
FIG. 2 is a schematic for optimizing hydro-cyclone separation in a filtering system which uses a pair of hydro-cyclones.

Referring to FIG. 1, an apparatus 10 for optimizing hydro-cyclone separation in a filtering system is shown. The apparatus 10 can be used to filter a fluid, such as water, which can be used in a commercial carwash. Alternatively, the apparatus 10 can be used for filter a fluid for use in various processes. For example, the apparatus 10 can be used in a manufacturing process where clean fluid is required or in a water purification process. The apparatus 10 includes one or more storage tanks 12. Three storage tanks are shown in FIG. 1 and they are referred to as a first storage tank 12, a second storage tank 12' and a third storage tank 12". The three storage tanks 12, 12' and 12" are all sequentially, fluidly connected. Two storage tanks 12, 12' can be utilized in a small filtering system. Three storage tanks 12, 12' and 12" are sufficient for many filtering systems. Four or more storage tanks 12, 12', 12" and 12''' can be used, as is shown in FIG. 2.

The size, shape and configuration of each of the storage tanks 12, 12', 12' and 12''' can vary. Each storage tank 12, 12', 12" and 12''' has a bottom wall 14, at least one sidewall 16 and a top wall 18. Each storage tank 12 can have a cylindrical configuration, a cubic configuration, a square or rectangular configuration, or some other geometrical configuration. Desirably, each of the first, second and third storage tanks, 12, 12' and 12" respectively, is of approximately the same size. Alternatively, one or more of the storage tanks 12, 12' and 12" can be of a different size. Each of the first, second and third storage tanks 12, 12' and 12' respectively, can be sized to hold a specific amount of fluid, normal water. For example, a storage tank 12 could be constructed to hold about 100 gallons, about 500 gallons, about 1,000 gallons, about 5,000 gallons, about 10,000 gallons or more.

Each of the first, second and third storage tanks, 12, 12' and 12" respectively, can be constructed out of various materials. For example, the first, second and third storage tanks, 12, 12' and 12" respectively, can be formed from concrete, plastic, metal, aluminum, tin, stainless steel, a thermoplastic material, fiberglass, a composite material, two or more materials, etc. Those skilled in the art are aware of the various materials which can be used to construct the storage tanks 12, 12', 12" and 12'''.

Each of the first, second and third storage tanks, 12, 12' and 12" respectively, can be closed and/or sealed, such as to keep dust, dirt and debris out. Each of the first, second and third storage tanks, 12, 12' and 12" respectively, can also have a cover 19. The cover 19 can be attached to the sidewall 16 and/or to the top wall 18. The cover 19 can be opened by removing it, pivoting it or sliding it relative to the sidewall 16 and/or the top wall 18 to form an opening into the storage tank 12. By opening the cover 19, the storage tank 12 can be inspected or any mechanism, such as a filter screen, located therein can be maintained or replaced.

Each of the first, second and third storage tanks 12, 12' and 12' respectively, can be positioned above ground or below ground. For example, the first, second and third storage tanks, 12, 12' and 12" respectively, can be enclosed in a housing type structure, such as a building or be positioned in a vault. Alternatively, the first, second and third storage tanks, 12, 12' and 12" respectively, can be positioned directly or indirectly on the ground, such as being placed on a concrete slab.

Each of the first, second and third storage tanks, 12, 12' and 12" respectively, is vented to the atmosphere. Therefore, the fluid in the first, second and third storage tanks, 12, 12' and 12" respectively, is under no pressure. A vent pipe can be added to each of the first, second and third storage tanks, 12, 12' and 12" respectively. Alternatively, an opening can be formed somewhere in each of the first, second and third storage tanks, 12, 12' and 12" respectively.

The first storage tank 12 has an inlet 20 located in an upper portion of the sidewall 16 or in the top wall 18. Alternatively, the inlet 20 could be formed in the cover 19, if desired. The inlet 20 allows fluid and/or water containing filtered particles, dirty water, soiled water, etc. to be routed into the first storage tank 12. The first storage tank 12 also has an outlet 22. The outlet 22 can be located in the periphery of the first storage tank 12. Desirably, the outlet 22 is located in an upper portion of the sidewall 16. The outlet 22 permits the fluid and/or water containing small particles, dirty water, soiled water, etc., which has not settled to the bottom of the first storage tank 12, to be routed to the second storage tank 12' via a pipe or conduit 24. The heavier or larger size solid particles, such as dirt, debris, sludge, etc. will eventually settle to the bottom of the first storage tank 12 and can be later removed by opening the cover 18. These solid particles can be transported to a landfill or be discarded in some environmentally friendly manner. By "dirt" it is meant a filthy or soiling substance. By "debris" it is meant fragments or small solid particles. By "sludge" it is meant a semisolid material, such as the type precipitated by sewage treatment.

The second storage tank 12' has a first inlet 26, a second inlet 28, a third inlet 30 and an outlet 32. The first inlet 26 can be located in an upper portion of the sidewall 16. The first inlet 26 connects with the pipe or conduit 24 from the first storage tank 12. The second inlet 28 is also located in an upper portion of the sidewall 16 or in the top wall 18 and permits incoming fluid (water) to be added to the second storage tank 12' as needed. Any new fluid which is added to the second storage tank 12' may come from various sources, such as from a municipal's water treatment facility. This fluid is relatively clean but may still contain small solid particles. Alternatively, the incoming fluid can come from a lake, a river, a pond, a well, etc., either before or after it has been filtered. This fluid may contain minerals as well as small solid particles. As such, the incoming fluid will vary in cleanliness and will need to be filtered before it can be used in the car washing facility.

The third inlet 30 is located in the top wall 18 and is used to permit recycle dirty fluid (water), that was used to wash vehicles, to be returned to the second storage tank 12'. This fluid can be directed to a drain, not shown, after a vehicle has been washed, and is then routed from the drain to the third inlet 30. The incoming fluid to the third inlet 30 is primarily recycled fluid from the car washing process. This fluid contains dirt and small particles. The third inlet 30 is connected to a pipe 34 which is positioned within the second storage tank 12'. The pipe 34 directs fluid downward to the interior of the second storage tank 12'.

The outlet 32 of the second storage tank 12' is fluidly connected by a pipe or conduit 36 to the third storage tank 12". The outlet 32 can be located anywhere in the periphery of the second storage tank 12'. Desirably, the outlet 32 is located in an upper portion of the sidewall 16.

The third storage tank 12" has an inlet 38 which can be located in the upper portion of the sidewall 16. The inlet 38 fluidly communicates with the pipe 36 so that fluid from the second storage tank 12' can be routed to the third storage tank 12" once the fluid in the second storage tank 12' reaches a predetermined level. Much of the sediment initially present in the fluid in the second storage tank 12' will fall to the bottom of the second storage tank 12' due to gravity. This will assure that the fluid being routed to the third storage tank 12" is fairly clean. The third storage tank 12" also has a first outlet 40 and a second outlet 42. The first outlet 40 is located in an upper portion of the sidewall 16 and functions to permits excess fluid to be drained from the third storage tank 12". Once the fluid level in the third storage tank 12" reaches the first outlet 40, it will be able to flow out of the third storage tank 12". The first outlet 40 can direct the overflow fluid to a drain (not shown). The second outlet 42 is positioned in the top wall 18 or in the cover 19. The second outlet 42 is fluidly connected to a first fluid line 44. The first fluid line 44 extends downward in to the third storage tank 12". Desirably, the first fluid line 44 will extend downward at least ⅓ of the height of the third storage tank 12". A filter or strainer (not shown) can be attached to the free end of the first fluid line 44.

The apparatus 10 also includes a pump 46 driven by a motor 48 having a variable speed drive 50. The motor 48 can be an AC motor. The pump 46 has an inlet 52 and an outlet 54. The first fluid line 44 connects the third storage tank 12" to the inlet 52 of the pump 46. The pump 46 functions to pressurize the incoming fluid. The pump 46 can create a constant pressure in the incoming fluid. For example, the pump 46 can be set to deliver a fluid at a predetermined pressure. A fluid pressure ranging from between about 30 pounds per square inch (psi) to about 80 psi should be sufficient for most applications. Desirably, the pump 46 can pressurize the incoming fluid to a pressure of at least 35 psi. More desirably, the pump 46 can pressurize the incoming fluid to a pressure of at least 40 psi. Even more desirably, the pump 46 can pressurize the incoming fluid to a pressure of at least 50 psi.

The pump 46 is a commercially available component. There are various manufactures of pumps. One such manufacturer is Gould Water Technologies 1 International Drive, Rye Brook, N.Y. 10573.

The pump 46 can vary in size, design and configuration depending upon the amount of fluid flow required. For example, a pump 46 having the ability to lift fluid to a height of 30 feet would work sufficiently for many carwash facilities. Desirably, the pump 46 could be designed to lift the fluid to a height of from between about 5 feet to about 50 feet. More desirably, the pump 46 could be designed to lift the fluid to a height of from between about 10 feet to about 40 feet. Even more desirably, the pump 46 could be designed to lift the fluid to a height of from between about 15 feet to about 30 feet.

The motor 48 is also a commercially available component. The motor 48 can vary in size, design and capacity depending on the parameters of the filtering system. Likewise, the variable speed drive 50 is also a commercially available component. The variable speed drive 50 can vary in size, design and capacity depending on the parameters of the filtering system. One such manufacturer is Mitsubishi Electric Co. having an office at 500 Corporate Woods parkway, Vernon Hills, Ill. 60061.

The apparatus 10 further includes a hydro-cyclone 56. By "hydro-cyclone" it is meant any of various devices using centrifugal force to separate solid particles and/or materials from a fluid. The hydro-cyclone 56 has an inlet port 58, a first outlet port 60 and a second outlet port 62. The hydro-cyclone 56 is positioned downstream of the pump 46. The hydro-cyclone 56 functions to separate out the heavier and/or larger size solid particles from the fluid. The hydro-cyclone 56 can be used separate out solid particles having a size of greater than about 5, 10, 15, 20, 25, 30, 35, 40, 45 or 50 micrometers from the fluid. Desirably, all solid particles greater than about 25 micrometers would be separated out from the incoming pressurized fluid. More desirably, all solid particles greater than 15 micrometers would be separated out from the incoming pressurized fluid. Even more desirably, all solid particles greater than 10 micrometers would be separated out from the incoming pressurized fluid. Most desirably, all solid particles ranging from about 5 micrometers or larger would be separated from the incoming pressurized fluid. In addition, the hydro-cyclone 56 could separate out solid particles based on their basis weight. For example, the hydro-cyclone 56 could separate out solid particles having a basis weight of 1.38×10-9 grams or greater from the fluid.

The hydro-cyclone 56 is a commercially available component. The hydro-cyclone 56 can come in a variety of shapes, designs and sizes. There are various manufacturers of hydro-cyclones. One such manufacturer is Compatible Components Corporation having an office at 1234 North Post Oak Road, Suite 100, Houston, Tex. 77055.

The hydro-cyclone 56 performs the function of separating the solid particles from the incoming fluid by creating a vortex. By "vortex" it is meant a spiral motion of the fluid within a limited area, especially a whirling mass of fluid (water) that sucks everything near it toward its center. The shape of the hydro-cyclone 56 forces the fluid against its inner surfaces with increasing speed as the cone shape of the hydro-cyclone 56 reduces in diameter as it approaches the bottom or second outlet port 62. A vortex is formed when the revolving fluid reaches the optimal speed for the centrifugal forces to the same as the specific weight of water. The fluid velocity is at its greatest next to the vortex. This forces the solid particles, with a specific weight greater than that of water, to the outer surfaces, while the cleaner water is forced up and out the top through the first outlet port 60. The heavier and/or larger solid particles collect against the inner wall of the hydro-cyclone 56 and are discharged through the second outlet port 62.

A second fluid line 64 connects the outlet 54 of the pump 46 to the inlet port 58 of the hydro-cyclone 56. The fluid entering the inlet port 58 of the hydro-cyclone 56 will be at a constant pressure. This pressure value can vary depending on the size and configuration of the various components of the apparatus 10.

The apparatus 10 further includes a first pressure transducer 66 positioned across the second fluid line 64. The first pressure transducer 66 functions to measure pump pressure. The first pressure transducer 66 is a commercially available component that comes in a variety of designs, shapes and sizes. There are various manufacturers of pressure transducers.

The fluid leaving the first outlet port 60 through the top of the hydro-cyclone 56 is routed through a third fluid line 68. The third fluid line 68 connects the first outlet port 60 of the hydro-cyclone 56 to a mechanism dispensing filtered fluid 72, such as the spray units of a commercial carwash. A flow transducer 70 is positioned across the third fluid line 68. The flow transducer 70 functions to measure fluid flow. The flow transducer 70 is a commercially available component that comes in a variety of designs, shapes and sizes. There are various manufacturers of flow transducers. One such manufacturer is Keyence Corporation of America having an office at 500 Park Boulevard, Suite 200, Itasca, Ill. 60143.

A second pressure transducer 74 is positioned across the third fluid line 68, downstream of the flow transducer 70. The second pressure transducer 74 functions to measure the output pressure. The second pressure transducer 74 is a commercially available component that comes in a variety of designs, shapes and sizes. There are various manufacturers of pressure transducers.

The apparatus 10 further includes a fourth fluid line 76 fluidly connected to and intersecting the third fluid line 68 between the flow transducer 70 and the second pressure transducer 74. The fourth fluid line 76 communicates with the third inlet 30 of the second storage tank 12'. A proportional flow control valve 78 is positioned across the fourth fluid line 76. The proportional flow control valve 78 functions by varying the size of the opening across the fourth fluid line 76. By operating (varying the size of the opening and/or closing) the proportional flow control valve 78, one can adjust the fluid flow therethrough. This means that any filtered fluid that is not immediately needed by the mechanism dispensing filtered fluid 72 (i.e., the carwash) can be directed to the second storage tank 12'. Essentially a bypass loop is created such that the hydro-cyclone 56 can continue to operate at maximum efficiency.

It is rarely possible for the flow demand of the mechanism dispensing filtered fluid 72 (i.e., the carwash) to equal the designed outflow of the hydro-cyclone 56. Many current designs are always in a state of compromise or may not be filtering at all if the total flow drops to a level that prevents a vortex from being established in the hydro-cyclone 56. The present invention overcomes this problem by allowing fluid to bypass the mechanism dispensing filtered fluid 72. This means that "full flow" through the hydro-cyclone 56 is always present. This allows the hydro-cyclone 56 to optimize the centrifugal separation and establish a consistent vortex.

The proportional flow control valve 78 is a commercially available component that comes in a variety of designs, shapes and sizes. There are various manufacturers of pressure transducers. One such manufacturer is Burkert Corporation having an office at 11425 Mt. Holly-Huntersville Road, Huntersville, N.C. 28078.

The apparatus 10 also includes a fifth fluid line 80 which connects the second outlet port 62 of the hydro-cyclone 56 to the first storage tank 12. The fifth fluid line 80 routes heavier and/or larger size solid particles (dirt), along with a very small amount of dirty fluid, which are separated out by the centrifugal action within the hydro-cyclone 56.

In the present filtering system, unfiltered fluid is pulled or sucked out of the third storage tank 12" by the pump 46 and pressurized to a predetermined pressure. This pressurized fluid is then routed to the hydro-cyclone 56 where it is filtered. Fluid flow through the hydro-cyclone 56 must be established to allow a resultant vortex to be created. The heavier and/or larger size solid particles (dirt) flow out through the second outlet port 62 of the hydro-cyclone 56.

In order to automatically allow the apparatus 10 to function properly, a controller 82 is required. The controller 82 is electrically connected to: the variable speed drive 50, the first pressure transducer 66, the flow transducer 70, the second pressure transducer 74, and to the proportional flow control valve 78. The controller 82 continuously controls fluid pressure and fluid flow. Based on this data, the controller 82 generates a signal to operate (open and close) the proportional flow control valve 78 whereby unneeded fluid in the third fluid line 68 can be routed to the second storage tank 12'. The opening and closing of the proportional flow control valve 78 is continuously controlled by the controller 82. The proportional flow control valve 78 is opened when the total fluid flow needed by the mechanism dispensing filtered fluid (carwash) 72 falls below the optimal amount required to maintain a vortex within the hydro-cyclone 56. The opening of the proportional flow control valve 78 stabilizes the total fluid flow while allowing the various components to adjust as needed. The proportional flow control valve 78 can divert from 0% to 100% of the fluid flowing through the third fluid line 68.

The controller 82 is a commercially available component that comes in a variety of designs, shapes and sizes. There are various manufacturers of controllers. One such manufacturer is Mitsubishi Electric Automation, Inc. having an office at 500 Corporate Woods Parkway, Vernon Hills, Ill. 60061. The controller 82 is programmable and can operate on an analog signal.

Referring now to FIG. 2, an apparatus 10" is depicted having a pair of hydro-cyclones 56 and 56'. Three or more hydro-cyclones 56 can be utilized, if needed. The pair of hydro-cyclone 56 and 56' can be identical in size, design and shape. The pair of hydro-cyclone 56 and 56' are positioned between the pump 46 and the flow transducer 70. The pair of hydro-cyclone 56 and 56' are arranged in parallel along the second fluid line 64. In other words, pressurized fluid from the pump 46 will enter the inlet ports 58, 58 of each of the pair of hydro-cyclones 56 or 56'. The clean, filtered fluid from the hydro-cyclones 56 and 56' will then exit through the respect first outlet ports, 60, 60. The heavier and/or larger size solid particles (dirt) will exit through the second outlet port 62, 62 of each of the pair of hydro-cyclones 56 and 56'. The pressurized fluid from the pump 46 does not flow through the first hydro-cyclone 56 and then into the second hydro-cyclone 56'.

FIG. 2 also depicts four storage tanks 12, 12', 12" and 12'''. The fourth storage tank 12''' can be similar in size to one of the first, second or third storage tanks, 12, 12' and 12" respectively. The fourth storage tank 12''' is positioned between the second and third storage tanks, 12' and 12" respectively. The fourth storage tank 12''' allows for a greater amount of fluid to be utilized in the filtering system. The fourth storage tank 12" also provides additional time for the heavier and/or larger size solid particles to settle out from the fluid. The fourth storage tank 12''' has an inlet 84 and an outlet 86. The inlet is fluidly connected to the pipe 36 extending outward from the second storage tank 12'. The outlet 86 is fluidly connected to a pipe 88 which connects with the inlet 38 formed in the third storage tank 12".

Method

A method for optimizing hydro-cyclone separation in a filtering system is also taught. The filtering system includes the apparatus 10 discussed above. Namely, a first storage tank 12, a second storage tank 12', and a third storage tank 12" are all sequentially fluidly connected. Four or more storage tanks 12, 12', 12" and 12" can be utilized. A pump 46 is present which is driven by a motor 48 which has a variable speed drive 50. The pump 46 has an inlet 52 and an outlet 54. A first fluid line 44 connects the third storage tank 12" to the inlet 52 of the pump 46. The pump pressurizes the incoming fluid from the third storage tank 12".

A hydro-cyclone having an inlet port 58, a first outlet port 60 and a second outlet port 62 is positioned downstream of the pump 46. A second fluid line 64 connects the outlet 58 of the pump 46 to the inlet port 58 of the hydro-cyclone 56. A first pressure transducer 66 is positioned across the second fluid line 64 for measuring pump pressure. A third fluid line 68 connects the first outlet port 60 of the hydro-cyclone 56 to a mechanism dispensing filtered fluid (carwash) 72. A flow transducer 70 is positioned across the third fluid line 68 for measuring fluid flow. A second pressure transducer 74 is positioned across the third fluid line 68 downstream of the flow transducer 70 for measuring output pressure. A fourth fluid line 76 fluidly connects and intersects the third fluid line 68 between the flow transducer 70 and the second pressure transducer 74. The fourth fluid line 76 communicates with the second storage tank 12'.

A proportional flow control valve 78 is positioned across the fourth fluid line 76. A fifth fluid line 80 connects the second outlet port 62 of the hydro-cyclone 56 to the first storage tank 12 for removing heavier and/or larger size solid particles from the hydro-cyclone 56. Lastly, a controller 82 is electrically connected to: the variable speed drive 50, the first pressure transducer 66, the flow transducer 70, the second pressure transducer 74, and to the proportional flow control valve 78.

The method includes the steps of routing outside fluid into the second storage tank 12'. The variable speed drive 50 is then activated to control the motor 48 and operate the pump 46, such that pressurized fluid is routed from the third storage tank 12" to the hydro-cyclone 56. The pressurized fluid will flow through the second fluid line 64 from the pump 46 to the hydro-cyclone 56 and past the first pressure transducer 66. The hydro-cyclone will create a vortex which will separate the heavier and/or larger size solid particles, having a predetermined size, from the incoming fluid. The clean, filtered fluid from the hydro-cyclone 56 is routed through a third fluid line 68 and pass the flow transducer 70 and the second pressure transducer 74 to the mechanism dispensing filtered fluid (carwash) 72. The controller 82 will continuously control the: variable speed drive 50, the first pressure transducer 66, the flow transducer 70, and the second pressure transducer 74. In other words, the controller 82 continuously monitors the fluid pressure and the fluid flow through the apparatus 10. Based on this data, the controller 82 will generate a signal to operate (open and close) the proportional flow control valve 78 whereby excess or unneeded fluid can be routed to the second storage tank 12' via the fourth fluid line 76.

The method further includes removing filtered solid particles from the second outlet port 62 of the hydro-cyclone 56 and routing them through the fifth fluid line 80 to the first storage tank 12. These heavier and/or larger size solid particles (dirt) can later be removed from the first storage tank 12. The removed heavier and/or larger size solid particles can be transported to a landfill or be discarded in an environmentally friendly manner.

While the invention has been described in conjunction with two specific embodiments, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. An apparatus for optimizing hydro-cyclone separation in a filtering system, comprising:
    a) a first storage tank, a second storage tank and a third storage tank sequentially fluidly connected;
    b) a pump driven by a motor having a variable speed drive, said pump having an inlet and an outlet;
    c) a first fluid line connecting said third storage tank to said inlet of said pump;
    d) a hydro-cyclone having an inlet port, a first outlet port and a second outlet port, said hydro-cyclone being positioned downstream of said pump and generating a filtered fluid;
    e) a second fluid line connecting said outlet of said pump to said inlet port of said hydro-cyclone;

f) a first pressure transducer positioned across said second fluid line for measuring pump pressure;
g) a third fluid line connecting said first outlet port of said hydrocyclone to a mechanism dispensing the filtered fluid provided by said hydrocyclone;
h) a flow transducer positioned across said third fluid line for measuring fluid flow;
i) a second pressure transducer positioned across said third fluid line downstream of said flow transducer for measuring output pressure;
j) a fourth fluid line fluidly intersecting said third fluid line between said flow transducer and said second pressure transducer, said fourth fluid line receiving excess fluid from said third fluid line and communicating with said second storage tank;
k) a proportional flow control valve positioned across said fourth fluid line;
l) a fifth fluid line connecting said second outlet port of said hydrocyclone to said first storage tank for removing particles from said hydro-cyclone; and
m) a controller electrically connected to said variable speed drive, said first pressure transducer, said flow transducer, said second pressure transducer, and to said proportional flow control valve, said controller continuously monitoring fluid pressure and fluid flow and generating a signal to operate said proportional flow control valve whereby the excess fluid can be routed from said fourth fluid line to said second storage tank.

2. The apparatus of claim 1 wherein said first, second and third storage tanks are sealed.

3. The apparatus of claim 1 wherein said first, second and third storage tanks are vented to the atmosphere.

4. The apparatus of claim 1 wherein said third storage tank contains an overflow port to allow excess fluid to be routed to a drain.

5. The apparatus of claim 1 wherein said second storage tank has a first inlet, a second inlet, a third inlet and an outlet, and said pump can pressurize said fluid to at least 30 psi and can lift said fluid to a height of 30 feet.

6. The apparatus of claim 1 wherein four or more storage tanks are present and said second storage tank contains an inlet port through which outside fluid can enter said filtering system.

7. The apparatus of claim 1 wherein said controller operates on an analog signal, and particles separated out of said fluid by said hydro-cyclone have a basis weight of $1.38 \times 10^{-9}$ grams or greater.

8. The apparatus of claim 1 wherein said hydro-cyclone can separate particles having a size of greater than about 5 micrometers from said fluid.

9. The apparatus of claim 1 wherein said hydro-cyclone can separate particles having a size of greater than about 10 micrometers from said fluid.

10. An apparatus for optimizing hydro-cyclone separation in a filtering system, comprising:
a) a first storage tank, a second storage tank, a third storage tank and a fourth storage tank sequentially fluidly connected;
b) a pump driven by a motor having a variable speed drive, said pump having an inlet and an outlet;
c) a first fluid line connecting said fourth storage tank to said inlet of said pump;
d) a hydro-cyclone having an inlet port, a first outlet port and a second outlet port, said hydro-cyclone being positioned downstream of said pump and generating a filtered fluid;
e) a second fluid line connecting said outlet of said pump to said inlet port of said hydro-cyclone;
f) a first pressure transducer positioned across said second fluid line for measuring pump pressure;
g) a third fluid line connecting said first outlet port of said hydrocyclone to a mechanism dispensing the filtered fluid provided by said hydrocyclone;
h) a flow transducer positioned across said third fluid line for measuring fluid flow;
i) a second pressure transducer positioned across said third fluid line downstream of said flow transducer for measuring output pressure;
j) a fourth fluid line intersecting said third fluid line between said flow transducer and said second pressure transducer, said fourth fluid line receiving excess fluid from said third fluid line and communicating with said second storage tank;
k) a proportional flow control valve positioned across said fourth fluid line;
l) a fifth fluid line connecting said second outlet port of said hydro-cyclone to said first storage tank for removing particles from said hydro-cyclone; and
m) a controller electrically connected to said variable speed drive, said first pressure transducer, said flow transducer, said second pressure transducer, and to said proportional flow control valve, said controller continuously monitoring fluid pressure and fluid flow and generating a signal to operate said proportional flow control valve whereby the excess fluid can be routed from said fourth fluid line to said second storage tank.

11. The apparatus of claim 10 wherein said fourth storage tank contains an overflow port to allow excess fluid to be routed to a drain.

12. The apparatus of claim 10 wherein said hydro-cyclone can separate solid particles having a size greater than about 15 micrometers from said fluid.

13. The apparatus of claim 10 wherein said hydro-cyclone can separate out solid particles having a size greater than about 20 micrometers from said fluid, and said pump can pressurize said fluid within a range of from between about 30 psi to about 80 psi.

14. The apparatus of claim 10 wherein said second storage tank has a first inlet, a second inlet, a third inlet and an outlet, and said pump can pressurize said fluid to at least 30 psi, and said pump can lift said fluid to a height of 30 feet.

15. The apparatus of claim 10 wherein at least two hydro-cyclones are positioned between said pump and said flow transducer.

16. The apparatus of claim 10 wherein said second storage tank contain an inlet port through which outside fluid can enter said filtering system.

17. A method for optimizing hydro-cyclone separation in a filtering system, said filtering system having a first storage tank, a second storage tank, and a third storage tank sequentially fluidly connected; a pump driven by a motor having a variable speed drive, said pump having an inlet and an outlet; a first fluid line connecting said third storage tank to said inlet of said pump; a hydro-cyclone having an inlet port, a first outlet port and a second outlet port, said hydro-cyclone being positioned downstream of said pump and generating a filtered fluid; a second fluid line connecting said outlet of said pump to said inlet port of said hydro-cyclone; a first pressure transducer positioned across said second fluid line for measuring pump pressure; a third fluid line connecting said first outlet port of said hydro-cyclone to a mechanism dispensing the filtered fluid provided by said hydro-cyclone; a flow transducer positioned across said third fluid line for measuring fluid flow; a second pressure transducer positioned across said third fluid line downstream of said flow transducer for measuring output pressure; a fourth fluid line intersecting said third fluid line between said flow transducer and said second pressure transducer, said fourth fluid line receiving excess fluid from said third fluid line communicating with said second storage tank; a proportional flow control valve positioned across said fourth fluid line; a fifth fluid line connecting said second outlet port of said hydro-cyclone to said first storage tank for removing particles from said hydro-cyclone; and a controller electrically connected to said variable speed drive, said first pressure transducer, said flow transducer, said second pressure transducer, and to said proportional flow control valve, said method comprising the steps of:
  a) routing outside fluid into said second storage tank;
  b) activating said variable speed drive to control said motor and operate said pump to route fluid from said third storage tank to said hydro-cyclone and past said first pressure transducer;
  c) using said hydro-cyclone to separate out heavier and/or larger size particles from said fluid;
  d) routing said filtered fluid through said flow transducer and said second pressure transducer to said mechanism dispensing filtered fluid; and
  e) using said controller to continuously control said variable speed drive, said first pressure transducer; said flow transducer, and said second pressure transducer, and to generate a signal to operate said proportional flow control valve whereby the excess fluid can be routed from said fourth fluid line to said second storage tank.

18. The method of claim 17 further comprising removing said heavier and/or larger size particles from said second outlet port of said hydro-cyclone and routing them through said fifth fluid line to said first storage tank.

19. The method of claim 17 further comprising removing said particles from said first storage tank.

20. The method of claim 19 further comprising removing said heavier and/or larger size particles from said first storage tank and transporting them to a landfill.

* * * * *